United States Patent
Saino

[11] 3,763,612
[45] Oct. 9, 1973

[54] COMPOSITE FIREDOOR WITH AN ADJUSTABLE EDGE

[76] Inventor: Joseph N. Saino, Memphis, Tenn.
[22] Filed: Mar. 4, 1971
[21] Appl. No.: 120,807

[52] U.S. Cl.................... 52/309, 52/463, 52/615, 52/625, 52/627
[51] Int. Cl. .................... E04c 2/36, E04c 2/38
[58] Field of Search.................... 52/626, 627, 618, 52/463, 309, 615, 586

[56] References Cited
UNITED STATES PATENTS

| | | | |
|---|---|---|---|
| 1,895,667 | 1/1933 | Junkers | 52/627 X |
| R24,558 | 10/1958 | Tyree | 52/627 X |
| 2,268,636 | 1/1942 | Becker | 52/463 X |
| 2,094,381 | 9/1937 | Slayter | 52/627 X |
| 3,104,194 | 9/1963 | Zahorski | 52/618 X |

Primary Examiner—Alfred C. Perham
Attorney—John R. Walker, III

[57] ABSTRACT

An assembly line method which includes providing a plurality of previously laminated steel sections, advancing the sections to a work station where they are severed to predetermined dimensions, then moving the severed sections past a plurality of stock supply points, stock cutting machines, and work stations where the stock and the sections are assembled and suitable joined together. These laminated sections include a core of resin-impregnated honeycomb kraft paper sandwiched between and bonded to a pair of confrontingly arranged sheets of steel. The finished firedoor panel includes various items of stock materials, e.g., "H" shaped vertical column member(s) for joining adjacent sections, splice plates for covering the abutting edges of adjacent sections, interior channel members, and exterior channel members. The latter two items extend along the perimeter of the door panel. The stock materials are fixedly attached to the severed laminated sections by a plurality of sheet metal screws to define a firedoor panel.

7 Claims, 8 Drawing Figures

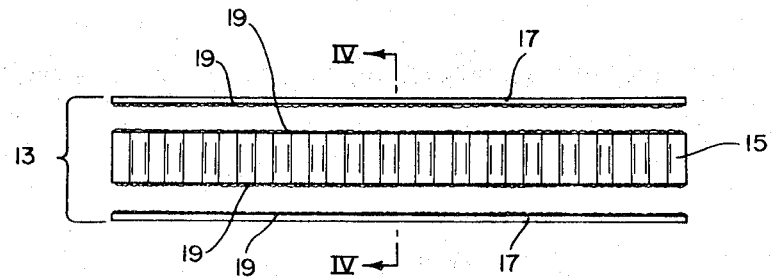
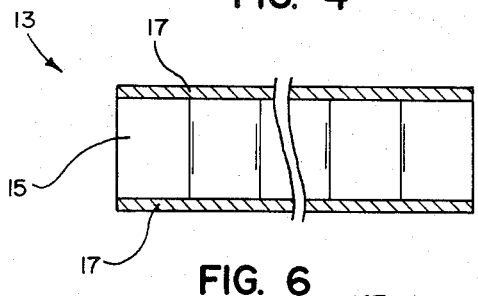
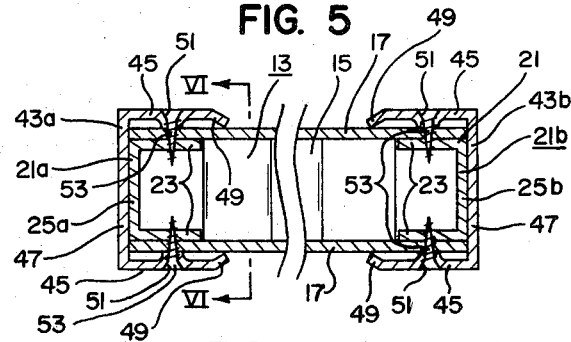
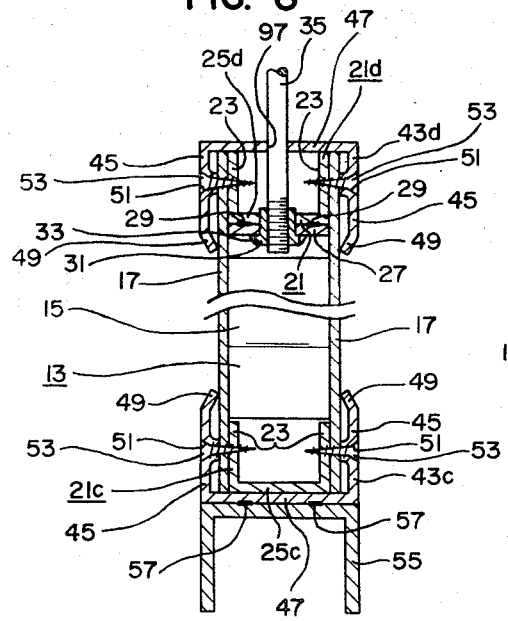
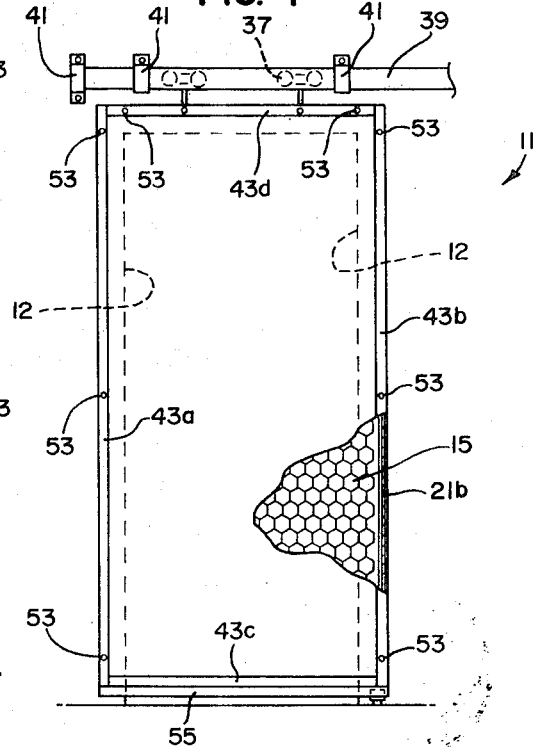
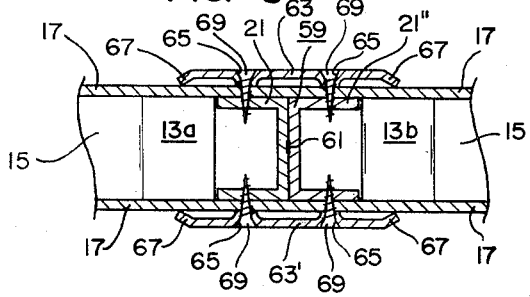
INVENTOR.
JOSEPH N. SAINO

COMPOSITE FIREDOOR WITH AN ADJUSTABLE EDGE

BACKGROUND OF THE INVENTION

1. Field of the Invention

This invention relates to firedoor construction and a method of fabrication thereof.

2. Description of the Prior Art

The first type firedoor known by the applicant was a tin-clad door having inner construction of usually three plies of lumber and the tin or metal edges are joined by a lock seam. Obviously, the ultimate dimensions of a tin-clad door must be known prior to commencing work on fabricating the door. In other words, the door is custom-made after the order, including the specifications, is received. A prevailing distinct disadvantage in constructing tin-clap doors is the objectionable lead time required by the manufacturer from the time the order is received until delivery of the door is made. Numerous other disadvantages of the tin-clad door include the excessive cost in labor required in the construction thereof. Also, tin-clad doors are very heavy.

The next generation of firedoors eliminated the wood core and were identified as corrugated steel firedoors. The door size specifications were also needed for these all steel doors prior to commencing work in fabricating the door. Like the tin-clad door, once the steel door is made up, it cannot be changed. However, the main disadvantage of both these type doors is the unreasonable lead time required by the manufacturer prior to delivery date.

More recently, Dusing and Hunt (now owned by Mesker Brothers Industry, Inc., of 6002 North Lindbergh Boulevard, Hazelwood, Missouri 63042), have introduced a composite firedoor which is clearly disclosed in the Mesker Brothers' catalog MSD 12/71. The Mesker catalog shows Dusing & Hunt flush-constructed slide doors which have a core material of solid calcium silicate block insulation sandwiched between sheets of steel having heavy gauge channel around the entire perimeter of the door. While the Mesker Dusing & Hunt firedoor panels may be made up of a plurality of sections, the door panel for other than a limited number of stock size door orders is still made from scratch subsequent to the manufacturer receiving the architectural specifications. In other words, the door sections have special shaped edges for joining one section to another, the special shaped edges being formed at the time of manufacture. Accordingly, the individual sections cannot be severed indiscriminately for subsequent joining one to the other for custom fitting odd size openings. Therefore, the prevailing disadvantage of unreasonable lead time required by the manufacturer is present in the Mesker Dusing & Hunt doors.

The Overley Manufacturing Co., Greensburg, Pennsylvania 15602, publishes a brochure No. 17N/OV, showing hollow metal firedoors. The Overley door has the prevailing disadvantage in that it must be fabricated from scratch subsequent to the architectural specifications being received by the manufacturer. Additionally, the dimensions of the Overley door cannot be changed after it has been made.

The Steelcraft Manufacturing Co., 9017 Blue Ash Road, Cincinnati, Ohio 45242, publishes a catalog No. 302 showing Steelcraft "J" sliding hollow metal firedoors. The Steelcraft Co. also publishes technical data sheets No. 139, 140 showing engineering details for steel "J" sliding firedoors. From these data, it can readily be seen that large firedoors are formed from multiple panel sections. Additionally, the sections or panels are joined by "H" type panel connectors. Further, the panels are of a composite construction having a resin-impregnated kraft honeycomb core bonded to the inner face surfaces of confrontingly arranged steel sheets. However, the sections making up these larger doors, as well as a single panel door, is constructed in such a manner that the steel sheets forming the exterior surfaces of the panels terminate adjacent the sides thereof in an interlocking manner which precludes severing the sides of the sections after they have been fabricated. Additionally, the "H" type panel connector simply overlaps the abutting adjacent panels and sheet metal screws are used to join the adjacent panels to the "H" type panel connector. Accordingly, the " J" sliding door of the Steelcraft Manufacturing Co. also possesses the heretofore-mentioned prevailing disadvantage in that the door for other than a limited number of stock size door orders must be fabricated from scratch subsequent to the manufacturer receiving the architectural specifications. In other words, the structure of these sections does not enable the manufacturer to stock blank size sections that can later be reworked to specific dimensions in order to cut down the manufacturing lead time. Additionally, an assembly line production is not feasible since the raw material making up the sections is all made while the door panel is being formed, i.e., substantially a hand-crafted operation.

It should be noted that it is not at all uncommon for a manufacturer utilizing prior known construction concepts to require a lead time of 14 – 16 weeks prior to delivery of custom-made firedoors.

SUMMARY OF THE INVENTION

The present invention is directed towards overcoming the disadvantages and problems relative to previous firedoors with particular emphasis being placed on the method of fabrication thereof. In this regard, the present invention discloses an assembly line method which includes providing a plurality of previously laminated steel sections, advancing these sections to a work station where they are severed to predetermined dimensions, then moving the sections past a plurality of stock supply points and stock cutting machines toward a work station where the stock and the sections are assembled and joined together by screws to define a firedoor panel. The firedoor panel may include only one section or a plurality of sections suitably joined.

Probably the most significant feature of the present invention is that an infinite number of custom-fitted or different size firedoors may be fabricated by suitably severing and joining a plurality of these previously laminated steel sections. Additionally, the non-stock sizes of firedoor panels can be delivered in approximately two-thirds the time that prior known firedoor panel construction required. This is primarily possible because at least 50 percent of the work can be accomplished and stockpiled prior to commencing to fabricate a firedoor to the architectural specification.

These laminated steel sections include a space core of resin-impregnated honeycomb kraft paper sandwiched between and bonded to a pair of confrontingly arranged sheets of steel. The sections are made up in three basic sizes, i.e., each being 4 feet 4 inches wide with the first being 8 feet 4 inches long, the second being 10 feet 4 inches long, and the third being 12 feet 4 inches long, which may be suitably severed and joined together to selectively define firedoor panels of infinite sizes. The dimensions of the finished firedoor panels are commensurate with a predetermined anticipated demand, i.e., the three basic sizes may be severed in height or in width, and any number may be suitably joined together so as to form a customized firedoor panel of any odd size regardless of the architectural specifications.

The advantages of the present invention are numerous. However, the most significant of these is that the lead time required by the manufacturer to complete a custom-made door is greatly reduced. Six weeks subsequent to the time the manufacturer receives the architectural specifications he can now effect delivery of any size custom-made door and most orders can be fabricated with a lead time of only four weeks. The sections can be mass produced and stockpiled during slack periods for ultimate use in the assembly line buildup of customized firedoor panels subsequent to the manufacturer receiving the architectural specifications. The finished firedoor panel includes various stock material, e.g., H-shaped vertical column members for joining adjacent sections, splice plates for covering the abutting edges of adjacent sections, interior channel and exterior channel members extending along the perimeter of the door panel, etc.

BRIEF DESCRIPTION OF THE DRAWINGS

FIG. 3 is an exploded side view of the structural elements defining a laminated raw edge section.

FIG. 4 is a sectional view taken as on the line IV—IV of FIG. 3.

FIG. 5 is identical to FIG. 4 except the additional structure for defining a firedoor panel is included and sectionally depicted.

FIG. 6 is a sectional view taken as on the line VI—VI of FIG. 5.

FIG. 7 is an elevational view of the completed firedoor panel in a typical environment, showing the passageway and the ancillary hardware for supporting the door panel and with a portion of the panel being broken away for purposes of illustration.

FIG. 8 is a sectional view substantially identical to FIG. 5 except the additional structure utilized in joining two adjacent raw edge laminated sections is included and sectionally depicted.

DESCRIPTION OF THE PREFERRED EMBODIMENT

Figure 1:
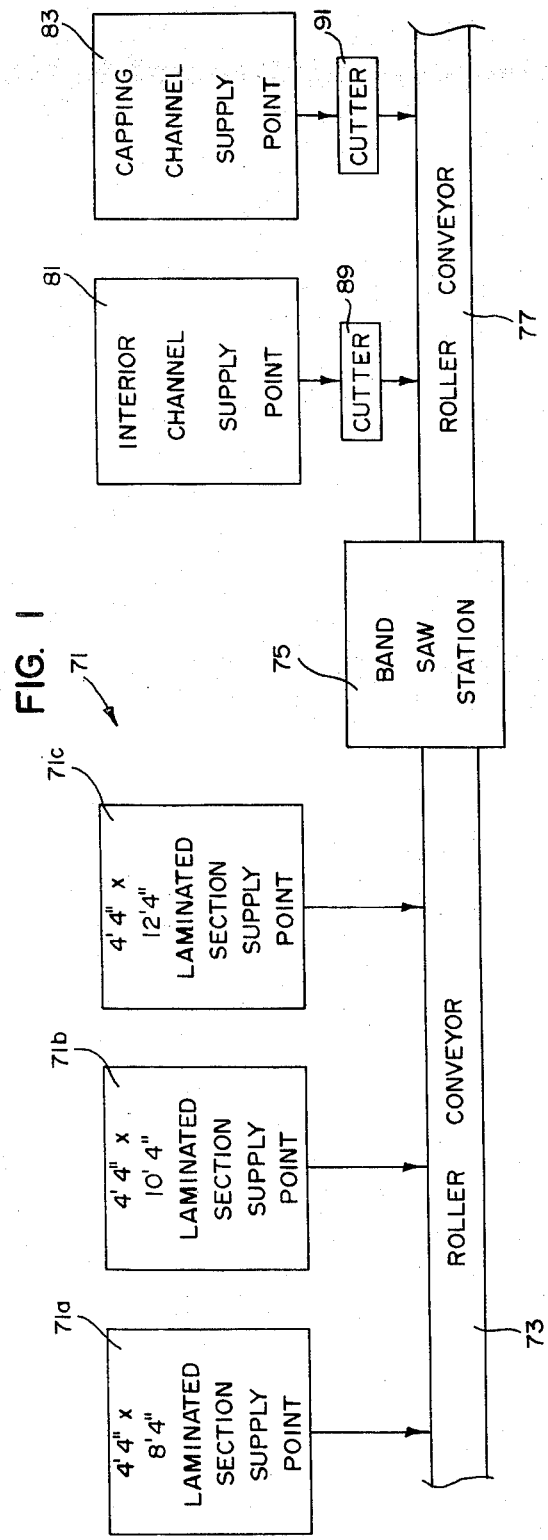
FIG. 1 is a diagrammatic illustration of the first portion of an assembly line for fabricating the modular firedoor of the present invention.

The door 11 of the present invention is intended to be used as a firedoor for automatically closing a passageway 12 in the event of a fire. Accordingly, the structure of the door 11 is in full compliance with the specifications of the Underwriters' Laboratory. Since the specifications are well known to those skilled in the art, no attempt will herein be made to elaborate or define any of these data other than that which may be considered beneficial in conveniently disclosing the structure of the present invention. A significant feature of the door 11 of the present invention is that it lends itself to an assembly line method of fabrication as herein disclosed. This feature greatly reduces the lead time which the manufacturer requires, i.e., a variable time frame commencing when the manufacturer receives the architectural specifications and terminates when the finished door assembly is received by the contractor or the like. It is anticipated that the lead time required to fabricate the door 11 of the present invention using the assembly line method herein disclosed will be reduced approximately 50 percent, i.e., prior lead time of 12 – 14 weeks and the anticipated lead time with the use of the present invention being four – six weeks.

Prior firedoor construction may appear to be somewhat like that of the door 11 of the present invention, however, none of the prior firedoors known by the applicant utilize structure which may be severed to infinite widths and/or lengths to be later joined together in forming a larger door panel. In other words, a concept of the present invention is to mass produce and stockpile a plurality of laminated sections 13, as best viewed in FIGS. 3 and 4 of the drawings. An important feature of the laminated section 13 of the present invention is the raw edge extending along the four edges thereof. The significance of the laminated sections 13 probably can best be appreciated by comparing the section 13 to a building brick or the like, i.e., the bricklayer uses a plurality of uniformly sized bricks and/or severed bricks in laying up a wall or the like. In like manner, a plurality of uniformly sized sections 13 and/or severed sections 13 may be suitably joined in forming the firedoor panel 11 of the present invention.

The section 13 includes a space core 15 permanently sandwiched between a pair of confrontingly arranged sheets of steel 17. The space core 15 may be formed from a variety of substances. However, I prefer to use a resin-impregnated honeycomb kraft paper. The space core 15 is suitably bonded to the sheets of steel 17 in any well known manner, e.g., a neoprene contact adhesive 19 or the like. The adhesive 19 is applied to both sides or the knife edges of the core 15 preferably by spraying. Additionally, the adhesive 19 is applied to the inner surfaces of both sheets of steel 17. The core 15 is then sandwiched between the sheets of steel 17 and pressed together, i.e., preferably being run through a roll press (not shown) or the like. The pressure bonds the core 15 to the steel 17 resulting in structure substantially as depicted in FIG. 4 of the drawings.

A standard door opening size in America has one of three heights, i. e., 8, 10, and 12 feet. In order for a firedoor to have the Underwriters Laboratory label, it must overlap the opening by at least 4 inches on both sides and above the header of the passageway 12. For this reason, I find that certain advantages, which will become more apparent as the remaining structure is disclosed, are achieved by fabricating three basic size sections 13. Each of these three sections have an identical nominal width of 4 feet 4 inches and the first section has a nominal height of 8 feet 4 inches, the second section has a nominal height of 10 feet 4 inches, and the third section has a nominal height of 12 feet 4 inches. It should be obvious that these three basic sections 13 are initially sized to the three standard door opening sizes previously described, i.e., the 8 feet 4 inches height being used for a passageway 12 having an 8 feet height, etc. In the event the height of the passageway 12 is not a standard size opening the section 13 best suited for the particular dimensions is selected and the extra length is simply cut away, i.e., the 8 feet 4 inches section 13 is selected when the height of the passageway 12 is less than 8 feet, the 10 feet 4 inches section 13 is selected when the height of the passageway 12 is greater than 8 feet, but less than 10 feet, and the 12 feet 4 inches section 13 is selected when the height of the passageway is greater than 10 feet but less than 12 feet.

For purposes of illustration, the following disclosure will first be limited to a door 11 having only one section 13, e.g., the passageway 12 having a nominal width of 3 feet 8 inches or less. In the event the passageway 12 is less than 3 feet 8 inches the section 13 is severed longitudinally so the width of the section 13 is substantially 8 inches greater than the width of the passageway 12. Additionally, in the event the height of the passageway 12 is less than 8 feet, the section 13 is severed transversely so that the height of the section 13 is substantially 4 inches greater than the height of the passageway 12. The raw edges of the section 13 produced in the severing process are substantially identical to the original raw edges. Accordingly, severing the section 13 to any desirable size presents no problem in completing the buildup of the door 11.

The door 11 includes an interior channel 21 extending along the length of the perimeter of the section 13. The interior channel 21 is received between the sheets of steel 17 so that the outermost surfaces of the opposing flanges 23 contiguously engage the inner surfaces of the sheets of steel 17. The interior channel 21 is recessed inwardly along the outermost margin of the section 13, preferably with the flanges 23 being directed inwardly along the sides and bottom portions of the door 11 and the flanges 23 being directed outwardly or upwardly along the top portion of the door 11, as best illustrated in FIGS. 5 and 6 of the drawings. Obviously, the space core 15 must first be suitably crushed or deformed prior to the interior channel 21 being brought into position.

In this regard, any well known manner for compressing or crushing the outermost margin of the honeycomb core 15 is acceptable. However, I prefer to use a wood block (not shown) or the like, having a dimension similar to the dimension of the interior channel 21, for providing the space for the interior channel 21. The wood block is simply urged between the sheets of steel 17 in any suitable manner, i.e., tapping with a mallet or the like.

From FIG. 5 of the drawings it may be seen that the left side interior channel 21a and the right side interior channel 21b have the flanges 23 thereof directed inwardly so that the innermost edges thereof engage the honeycomb core 15 and the outermost surfaces of the weblike portions 25a, 25b interconnecting the opposing flanges 23 are substantially flush with the outermost edges of the sheets of steel 17.

From FIG. 6 of the drawings, it may be seen that the innermost edges of the flanges 23 of the horizontally disposed lowermost interior channel 21c are directed inwardly and the innermost edges thereof engage the honeycomb core 15. Additionally, the outermost surface of the weblike portion 25c interconnecting the flanges 23 is substantially flush with the lowermost edges of the sheets of steel 17.

From FIG. 6 of the drawings, it may also be seen that the horizontally disposed uppermost interior channel 21d has the opposing flanges 23 thereof directed outwardly or upwardly so that the outermost edges thereof are substantially flush with the uppermost edges of the sheets of steel 17.

Th weblike portion 25d interconnecting the opposing flanges 23 of the interior channel 21d is conveniently fitted with an elongated reinforcement member 27 in any well known manner, e.g., a plurality of spot welds 29 or the like. Additionally, the weblike portion 25d and the reinforcement member 27 are provided with suitable apertures for receiving a nutlike member 31 having a cross sectional shape substantially as illustrated in FIG. 6 of the drawings.

The nutlike member 31 preferably is fixedly attached to the reinforcement member 27 in any well known manner, e.g., welds 33 or the like. Obviously, the reinforcement member 27 and the nutlike member 31 are fixedly attached to the interior channel 21d at a convenient point in time or during a slack period so that during the assembly line buildup of the door 11 the interior channel 21d need only be cut to the desired length. In this regard, the interior channel 21d preferably is cut at each end thereof so that the nutlike member 31 is positioned substantially intermediate the length of the member 21, as best viewed in FIG. 7.

The door 11 includes suitable suspension means as suspension bolts 35, having the lower ends thereof each threadedly received by a nutlike member 31. The bolts 35 extend downwardly from typical bolsters 37 which ridingly and runningly travels along a typical suspension rail 39. The suspension rail 39 is fixedly attached to the wall by a plurality of typical support brackets 41 in a manner obvious to those skilled in the art.

It should be understood that an entity component hereinafter conveniently referred to as a partially completed panel is established when the interior channel members 21a, 21b, 21c, and 21d are suitably received between the sheets of steel 17 of the section 13 in the manner just disclosed.

The door 11, in addition to the just-mentioned partially completed panel, includes elongated capping channel members 43a, 43b, 43c, and 43d. The left and right capping channel members 43a, 43b have a length equal to the height of the door 11, as best viewed in FIG. 7 of the drawings. The lower and upper capping channel members 43c, 43d have a length substantially equal to the width of the door 11, i.e., irrespective of the number of sections 13 from which the door 11 may be formed. One of the ends of the respective members 43c, 43d engages the member 43a and the other ends of the members 43c, 43d engages the member 43d.

In cross section each of the capping channel members 43a, 43b, 43c and 43d have a shape substantially as depicted in FIGS. 5 and 6 of the drawings. In other words, the channel members 43a, 43b, 43c and 43d have opposing flange portions 45 interconnected by a weblike portion 47. Each of the opposing flanges 45 terminate at the outermost edges thereof with an inturned toe 49, for reasons yet to be disclosed. The flange portions 45 are provided with a plurality of symmetrically arranged apertures 51 for respectively receiving a plurality of sheet metal screws 53 or the like.

The surface of the door 11 preferably is smooth and void of protruding screwheads or the like. Accordingly, the heads of the screws 53 are flush with the outermost surfaces of the flange portions 45 as best viewed in FIGS. 5 and 6 of the drawings. An expedient technique herein utilized and well known in the art of sheet metal obviates the cost of conventional countersinking. This technique facilitates production punching of the flanges 45 to provide the apertures 51 therein and includes the production operation of dimpling the material adjacent the outer perimeter of the aperture 51. The dimpling operation primarily is to provide a tapered hole for countersinking the head of the screws 53. However, the thickness of the flange portions 45 is such that the dimpling process generates a protruding portion on the inner side of the flanges 45. Accordingly, the inturned toe 49 contiguously engages the respective surfaces of the sheets of steel 17 and the inner surfaces of the flange portions 45 have a spaced apart relationship from the respective sheets of steel 17, thus enabling the heads of the screws 53 to be flush with the outer surfaces of the flange portions 45.

The opposing flanges of the capping channel members 43a, 43b, 43c, and 43d are directed inwardly of the section 13 so as to overlappingly engage the outermost margin of the section 13 as best viewed in FIGS. 5 and 6 of the drawings. In other words, the inner surfaces of the capping channel members 43a, 43b, 43c, and 43d contiguously engage the outermost edges of the sheets of steel 17.

The capping channel member 43c (FIG. 6) has fixedly attached thereto in any well known manner a typical guide roller channel member 55, e.g., the member 55 being fixedly attached to the channel 43c by a plurality of spot welds 57 or the like. The member 55 preferably is fixedly attached to the channel 43c during a slack period or by a person not engaged in the assembly line buildup of the door 11 so that the piece of stock, comprising the channel 43 having the member 55 fixedly attached thereto, need only be cut to a length commensurate with the size of the door 11 during the assembly line buildup thereof.

The screws 53 preferably are installed by the use of an automatic screw gun or the like (not shown) which urges the screws 53 through the sheet steel 17 and the flange portions 23 of the interior channel 21. In other words, a well known expediency is used to obviate the necessity for drilling holes in the sheets of steel 17 and the flanges 23 for receiving the screws 53.

It should be understood that the likelihood of a passageway being of such a size as to use only one section 13 is rather remote since most passageways are a nominal 8 feet in height and have a minimum width of 8 feet. Accordingly, two sections 13a, 13b (FIG. 8) are usually joined to accommodate such passageways. Thus, the width size of 4 feet 4 inches for the section 13 is selected so that two sections 13a, 13b when suitably joined, provide the required 4 inches overlap on either side of a passageway 12 having a nominal width of 8 feet. However, other passageways having odd dimensions requiring custom-fitted firedoors are easily and quickly assembled from the basic size sections 13. The width of the passageway determines the number of full sections or severed sections used in constructing the door 11.

From FIG. 8 of the drawings, it may be seen that the sections 13a, 13b are joined together vertically by an "H" column having a length substantially equal to the height of the door 11. It should be understood that detailed description of joining two sections 13a, 13b is simply repeated when the width of the passageway 12 is such that more than two sections 13 are desired. Accordingly, the scope of the present invention is not to be limited to a door 11 having only two sections 13a, 13b.

The "H" column 59 preferably is formed by a pair of interior channel members 21', 21" fixedly attached one to the other in any well known manner, e.g., a plurality of spot welds 61 or the like. Accordingly, the respective interior channel members 21', 21" have an identical relationship with the sections 13a, 13b as previously disclosed for the partially completed panel. In other words, the interior channel 21' or the left interior channel is received by the section 13a and the interior channel 21" or the right interior channel is received within the section 13b so that the respective outermost surfaces of the opposing flanges 23 thereof contiguously engage the inner surfaces of the sheets of steel 17 forming the sections 13a, 13b. The sheets of steel 17 of the section 13a have an abutting relationship with the sheets of steel 17 of the adjacent section 13b.

The door 11 also includes a plurality of elongated splice plates 63 having a length substantially equal to the height of the door 11, i.e., a splice plate 63 overlapping the abutting edges of the adjacent sections 13a, 13b on the one side of the door 11 and a splice plate 63' overlapping the abutting edges of the sections 13a, 13b on the other side of the door 11.

The splice plates 63, 63' are provided with a plurality of apertures 65 and coacting dimples like those previously described for the apertures 51. Each of the splice plates 63, 63' have a downturned toe 67 along the left and right margins thereof, as best viewed in FIG. 8 of the drawings. The toe 67 has function and structure identical to the toe 49 previously described. Additionally, the splice plates 63, 63' are fixedly attached to the sections 13a, 13b by a plurality of screws 69. The screws 69, being received in the apertures 65, are installed in a manner like that previously described for the screws 53.

The splice plates 63, 63' preferably terminate a distance from the lower and upper edges of the abutting sections 13a, 13b. This distance is substantially equal to the vertical distance between the opposing flanges 45 for the respective capping channels 43c, 43d so that the capping channel members 43c, 43d are continuous regardless of the number of sections 13 making up the door 11, as previously described. It should be understod that an entity component hereinafter referred to as a sub-assembly is established when a group of at least two sections are joined as above described.

Figure 2:
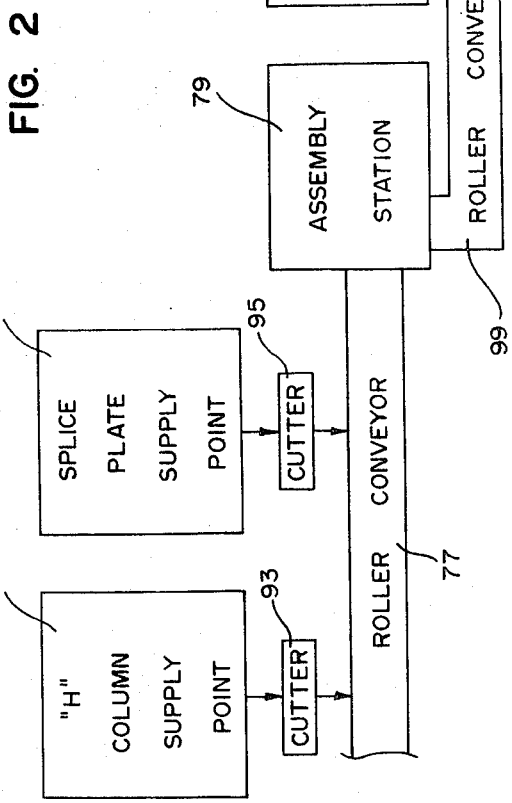
FIG. 2 is a continuation of FIG. 1 diagrammatically illustrating the final stations along the assembly line.

Referring now to FIGS. 1 and 2 of the drawings wherein an assembly line method of fabricating the firedoor 11 is diagrammatically illustrated, the assembly line preferably commences at a laminated section supply point 71 wherein the stock pile of a plurality of sections 13 is segregated into the previously described three basic sizes. In other words, a supply point 71a receives the 8 feet 4 inches sections, a supply point 71b receives the 10 feet 4 inches sections, and a supply point 71c receives the 12 feet 4 inches sections. Workmen positioned adjacent the supply points 71a, 71b, 71c place the appropriate quantity and size sections 13 onto a roller conveyor 73 and the sections 13 are manually urged along the conveyor 73 to a first work station or a high speed band saw station 75. Here workmen using the bandsaw sever the sections 13 to predetermined dimensions commensurate with the dimensions of the passageway 12 or the architectural specifications.

The severed sections 13 are then placed on a second roller conveyor 77 and are manually urged past a plurality of stock supply points and stock cutting machines towards a second work station or assembly station 79. The plurality of stock supply points include an interior channel supply point 81, a capping channel supply point 83, an "H" column supply point 85, and a splice plate supply point 87. A plurality of cutters 89, 91, 93, 95 are respectively located adjacent the stock supply points 81, 83, 85, 87. Workmen select the proper stock from the stock supply points 81, 83, 85, 87 and cut it to the predetermined dimensions as prescribed by the architectural specifications. The cutters 89, 91, 93, 95 preferably are band saws or may be other cutting devices, e.g., hydraulic shears or the like. The properly dimensioned stock is placed upon the sections 13 and moves to the assembly station 79 thereon.

It should be understood that the interior channel supply point 81 includes the special interior channel member 21d having the reinforcement member 27 and the nutlike members 31 fixedly attached thereto in a manner previously described. Additionally, the capping channel supply point 83 includes the special capping channel 43c having the guide roller channel member 55 fixedly attached thereto in a manner previously described. Further, the upper capping channel member 43d may optionally be stocked at the capping channel supply point 83 with an apertures 97 previously drilled therein for receiving suspension bolts 35 (FIG. 6) or the workmen at the assembly line may drill the apertures 97 in the weblike portion 47 thereof during the assembly line operation.

Workmen positioned at the assembly station 79 assemble the previously disclosed partially completed panels and/or subassemblies, i.e., the entity components. The above mentioned components, being placed on a third roller conveyor 99, are advanced to a third work station or automatic screw gun station 101. Here the workmen operating automatic screw guns inject the plurality of screws 53 and/or 69, in a manner previously disclosed, to fixedly attach the above mentioned stock to the group of sections 13 to define the firedoor panel 11 of the present invention.

Workmen using a fourth roller conveyor 103 move the finished firedoor panels 11 toward a fourth work station or packing, crating and shipping station 105. Here the workmen accomplish the necessary knockdown procedures so that the physical size of the firedoor 11 is compatible with normal shipping requirements. The knocked down firedoor 11 is then suitably packed and/or crated for shipping to the contractor or the like.

From the foregoing, it should be apparent that I am enabled to fabricate a modular firedoor 11 using an assembly line method. Further, the method includes stockpiling of previously fabricated laminated raw edge sections 13 of three basic sizes, which may be suitably severed and joined together to selectively define firedoor panels 11 of infinite sizes. The dimensions of these firedoor panels 11 are commensurate with a predetermined anticipated demand. Accordingly, a considerably reduced lead time is required by the manufacturer in effecting delivery of the customized firedoors 11 of the present invention.

Although the invention has been described and illustrated with respect to a preferred embodiment thereof, it is not to be so limited since changes and modifications may be made therein which are within the full intended scope of the present invention.

I claim:

1. A composite firedoor panel comprising flat rectangular space core means having a substantially uniform thickness, a pair of rectangular shaped confrontingly arranged planar sheets of steel, said space core means being permanently sandwiched between said sheets of steel to define an adjustable prefabricated section having a raw edge about the perimeter thereof which may subsequently be severed indiscriminately to any desired lesser dimension, elongated interior channel means extending along the length of the perimeter of said section, said interior channel means being received between said pair of sheets of steel so that the outermost surfaces of the opposing flanges thereof respectively contiguously engage the inner surfaces of said pair of sheets of steel inwardly and along the outermost margin of said section, elongated capping channel means also extending along the length of the perimeter of said section and having the opposing flanges thereof directed inwardly of said section so that the opposing flanges of said capping channel means overlappingly engage the outermost margin of said section, screw means fixedly attaching said capping channel means and said interior channel means to said section.

2. The panel of claim 1 in which said space core means consists of resin-impregnated honeycomb kraft paper and said prefabricated section additionally includes bonding means bonding the edges of said honeycomb paper to the inner surfaces of said confrontingly arranged sheets of steel.

3. A composite firedoor panel comprising flat rectangular space core means having a substantially uniform thickness, a plurality of pairs of rectangular shaped confrontingly arranged planar sheets of steel, said space core means being permanently sandwiched between said pairs of sheets of steel to define a group of at least two adjustable prefabricated sections respectively having raw edges about the perimeters thereof which may subsequently be severed indiscriminately to any desired lesser dimension, elongated H-shaped column means having a length substantially equal to the height of said group of prefabricated sections, said column means including left and right interior channel means disposed in a back to back relationship and fixedly attached one with the other to define said H-shape for rigidly joining two adjacent abutting sections of said group of sections, said left and right interior channel means respectively being received between said plurality of pairs of sheets of steel so that the outermost surfaces of the opposing flanges thereof contiguously engage the respective inner surfaces of said plurality of pairs of sheets of steel of said adjacent sections, elongated splice plate means having a length substantially equal to the length of said "H" column means for covering the margins adjacent the joined edge portions of said adjacent sections, first screw means fixedly attaching said splice plate means and said "H" column means to said adjacent abutting sections so as to form a subassembly comprising a group of at least two of said prefabricated raw edge sections, elongated interior channel means extending along the length of the perimeter of said subassembly, said interior channel means being received between said pairs of sheets of steel so that the outermost surfaces of the opposing flanges thereof contiguously engage the appropriate inner surfaces of said pairs of sheets of steel of said group of said sections inwardly and along the outermost margin of said subassembly, elongated capping channel means also extending along the length of the perimeter of said subassembly and having the opposing flanges thereof directed inwardly of said subassembly so that the opposing flanges of said capping channel means overlappingly engage the outermost margin of said subassembly, second screw means fixedly and rigidly attaching said capping channel means and said interior channel means to said subassembly.

4. The panel of claim 3 in which said space core means consists of resin-impregnated honeycomb kraft paper and said prefabricated section additionally includes bonding means bonding the edges of said honeycomb paper to the inner surfaces of said confrontingly arranged sheets of steel.

5. The firedoor panel of claim 3 in which said elongated splice plate means includes remote margins extending along the length of said splice plate means, and a pair of downturned toe portions respectively joined to said remote margins and defining the termini thereof for contiguously engaging the respective outer surfaces of abuttingly arranged sheets of steel along the length of said splice plate means.

6. A composite firedoor panel comprising flat rectangular space core means having a substantially uniform thickness, a pair of rectangular shaped confrontingly arranged planar sheets of steel, said space core means being permanently sandwiched between said sheets of steel to define an adjustable prefabricated section having a raw edge about the perimeter thereof which may subsequently be severed indiscriminately to any desired lesser dimension, elongated interior member means extending along the length of the perimeter of said section, said interior member means being received between said pair of sheets of steel so that the outermost surfaces of opposing portions thereof respectively contiguously engage the inner surfaces of said pair of sheets of steel and along the outermost margin of said section, elongated capping channel means also extending along the length of the perimeter of said section and having the opposing flanges thereof directed inwardly of said section so that the opposing flanges of said capping channel means overlappingly engage the outermost margin of said section, screw means fixedly attaching said capping channel means and said interior member means to said section.

7. The firedoor panel of claim 6 in which said capping channel means includes a pair of spaced apart flange portions joined one to the other by a web portion, said flange portions having a predetermined spaced apart distance which is greater than is the thickness of said prefabricated section whereby said flange portions have a spaced relationship from said respective sheets of steel, and a pair of inturned toe portions respectively joined to said pair of flange portions and defining the termini thereof for contiguously engaging the respective outer surfaces of said confrontingly arranged sheets of steel along the length of said capping channel means.

* * * * *